No. 647,125. Patented Apr. 10, 1900.
H. M. WINTER.
BICYCLE LOCK.
(Application filed Aug. 1, 1899.)
(No Model.)
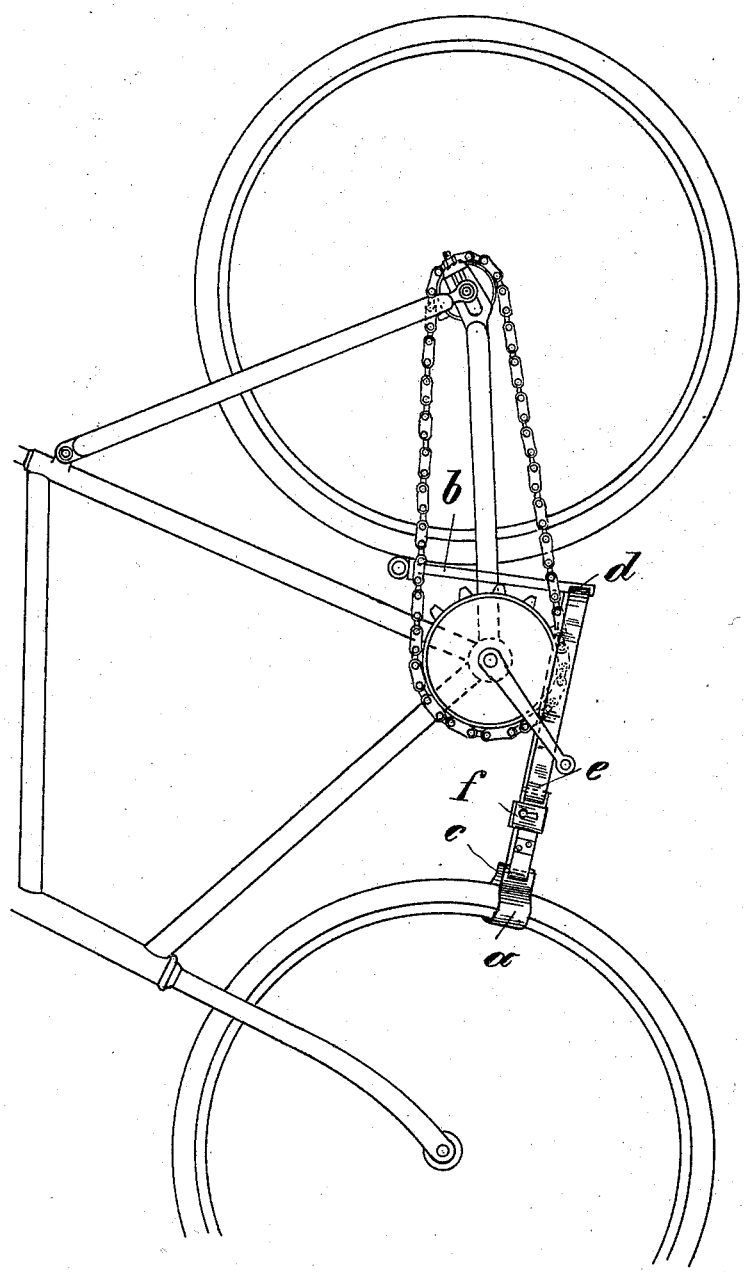
WITNESSES
Ella L. Giles
INVENTOR
Hermann Max Winter
BY
Richardson
ATTORNEYS
THE NORRIS PETERS CO., PHOTO-LITHO., WASHINGTON, D. C.

UNITED STATES PATENT OFFICE.

HERMANN MAX WINTER, OF BLASEWITZ, GERMANY.

BICYCLE-LOCK.

SPECIFICATION forming part of Letters Patent No. 647,125, dated April 10, 1900.

Application filed August 1, 1899. Serial No. 725,786. (No model.)

*To all whom it may concern:*

Be it known that I, HERMANN MAX WINTER, a subject of the Emperor of Germany, and a resident of Blasewitz, near Dresden, in the Kingdom of Saxony, German Empire, have invented certain new and useful Improvements in Bicycle-Locks, of which the following is a specification, reference being had to the accompanying drawing, forming a part thereof.

In the drawing the figure shows the lock applied to a bicycle shown in side elevation.

In the figure, $a$ represents a clip designed to be placed around the rim and tire of the front wheel and having slits $c$ in the free edges or ends thereof.

$b$ represents a bolt which is designed to be slipped through the openings in the chain and is provided with a head at one end and a slot or opening $d$ at the other.

In order to securely lock the parts, a flexible slide-band $e$ is passed through the slots $c$ and $d$ and the ends of the band secured together by means of a lock $f$ of suitable construction.

Having thus described my invention, what I claim is—

In a bicycle-lock, a clip $a$, adapted to embrace the bicycle-wheel, a bolt or rod adapted to be inserted through the openings in the chain, a flexible metallic band adapted to be inserted through openings in the clip and bolt, and locking means for securing the ends of the band together, substantially as described.

In witness whereof I have hereunto set my hand in presence of two witnesses.

HERMANN MAX WINTER.

Witnesses:
PAUL ARRAS,
HERNANDO DE SOTO.